Patented Mar. 6, 1934

1,949,925

UNITED STATES PATENT OFFICE 1,949,925

PIGMENT AND PROCESS FOR MAKING SAME

Frank G. Breyer, New Castle, and Joseph P. Koller, Wilmington, Del., assignors, by mesne assignments, to Krebs Pigment & Color Corporation, Wilmington, Del., a corporation of Delaware No Drawing. Application September 19, 1928, Serial No. 307,047

4 Claims. (Cl. 134—78)

Our invention pertains to a process for producing pigments which are characterized particularly by their ability, when incorporated in high concentration in enamel-making vehicles, to cause the enamel made therefrom to level out to a uniform, porcelain-like film. The painter speaks of this attribute of an enamel as its flow or levelling tendency and generally gauges this by the ability of the enamel to flow out and eliminate the brush marks which usually appear during application. Our invention relates particularly to the improvement of the flowing qualities of pigments which are normally relatively deficient in those qualities, when used in high concentration.

Our improved pigments are useful not only in high concentration enamels but also in flat wall paints, undercoaters, and in other paints where the elimination of brush marks is of importance. While our invention is capable of application to any pigment deficient in flowing qualities, we shall first describe it more particularly as applied to lithopone manufacture.

When ordinary lithopone is incorporated in high concentration in a good enamel vehicle, as for example when the lithopone content of the enamel is approximately 60% and the vehicle content approximately 40%, the final application of this enamel will result in distinct ridges and valleys in the dry film where the hairs of the brush used to apply the enamel have passed. When the improved lithopone produced in accordance with our invention is applied under the same conditions the enamel will slowly flow or level out these ridges and valleys, causing them to dissappear before the film dries. This will result in a smooth, porcelain-like surface. One of the characteristics of a good French process zinc oxide enamel, which up to the present time has been considered the highest class of enamel, is its capacity to flow and level out these brush marks. The value of lithopone as a substitute for zinc oxide in enamel may be partly gauged by comparing its behavior as contrasted with French process zinc oxide so far as the flowing quality is concerned, when the pigments have been ground in identical vehicles. While ordinary lithopone is not comparable with French process zinc oxide in this respect, the improved lithopone manufactured in accordance with our invention is the equivalent of zinc oxide.

We have discovered that the flowing properties of lithopone may be improved by immersing particles of this pigment in an aqueous solution of sodium silicate. Under these conditions the pigment particles adsorb the silicate from solution, and the subsequent recovery and drying of the lithopone results in a pigment having a much improved flowing quality.

Certain prior patents have proposed the addition of sodium silicate to freshly precipitated lithopone or the addition of this material simultaneously with the mixing of the zinc sulfate and barium sulfide solutions, the silicate thus added being present during muffling and quenching operations. We have found that silicate added in this manner has little or no effect on the flowing qualities of the lithopone although it does decrease the light resistance of the lithopone, and also appears to coarsen the grain. This latter phenomenon is apparently due to the fritting action of the silicate during muffling. Certain other prior patents have proposed the addition of about 3% of alkaline earth silicates in admixture with similar quantities of salts of alkali metals, it being stated that these materials may be added at any convenient point during the manufacture of the lithopone for the purpose of improving its light resistance. When such materials are added prior to the muffling operation the grain of the lithopone is rendered coarse and the pigmentary value of the product is generally reduced by the fritting action of the silicate under the influence of heat. In any event the quantity of silicate proposed by these patents is so great that it has an unfavorable effect on flow, even if added subsequent to the muffling operation.

While we have discovered that the flowing properties of any ordinary lithopone may be improved by the treatment with sodium silicate which we shall hereinafter describe in detail, we prefer to produce the lithopone to be treated in accordance with the following plan since in this manner we obtain a lithopone having the best flowing qualities.

We prefer to use a zinc liquor as free as practicable from water-soluble salts other than zinc sulphate and containing not over 1 gram of chlorine per liter of 20° Bé. zinc sulfate. The barium sulfite solution used should be low in alkalines and it should have a SH to OH ratio not less than 49 to 51. These two solutions are combined to produce lithopone in such a manner that only a slight excess of barium sulfide is present at the end of the "strike". This excess should show an iodine titration equivalent to not more than 0.15% grams of BaS per liter of press effluent. After the strike is finished we prefer to add about 0.5–2.0% (on the dry weight of the lithopone) of chemically precipitated basic carbonate of magnesia.

After filtering the strike we prefer to dry the cake to an average moisture content of not less than 2% and not more than 6%. We then muffle the dried half-finished cake in its own atmosphere or in an atmosphere of added steam up to a temperature of about 740–780° C.

After wet grinding the quenched finished lithopone in the usual manner we prefer to refine the grain size to that of a good French process zinc oxide by passing a slurry of the product through an effective "colloid mill" such as the Charlotte Homogenizer sold by the Chemi-Colloid Mill Co. of New York city.

The result of the special precautions and treatments outlined above is to produce a uniform fine textured lithopone.

Before adding sodium silicate to the lithopone we prefer to adjust its degree of alkalinity so that titration in accordance with the hereinafter described methyl orange test requires between 3 and 5 cc. of 1/50 normal sulfuric acid and so that its alkalinity by the phenolphthalein test is equal to .0002 NaOH. If dry pigment produced from the slurry from the colloid mill is not sufficiently alkaline, as shown by these tests, sodium carbonate or equivalent should be added to the slurry in sufficient quantity to produce the desired alkalinity.

The methyl orange test is made as follows: 50 grams of pigment is stirred by a malted milk stirrer with 250 cc. of water at room temperature for 5 minutes. The pigment is then allowed to settle and 100 cc. of the supernatant liquid is removed. A drop of methyl orange is added and the liquid is titrated to acid reaction with N/50 sulfuric acid. The alkalinity to methyl orange is then expressed as the number of ccs. of N/50 sulfuric acid necessary to neutralize the alkalinity in 20 grams of pigment as outlined in the above procedure.

The phenolphthalein test is made as follows: When 5 grams of pigment are shaken in 20 cc. of water and 5 drops of phenolphthalein indicator are added, it should produce a color equal to that produced by adding 0.5 cc. of N/100 caustic potash to an equal volume of water and indicator. This is equivalent to .0002 NaOH grams on the 5 grams of lithopone.

To the aqueous slurry, which usually contains about 1 part of lithopone to 2½ parts of water we then add an aqueous solution of sodium silicate, the amount of silicate added varying from 0.3–0.5% of dry sodium silicate calculated as $Na_2SiO_3$ based on the dry weight of lithopone in the slurry. The slurry is then agitated for a half an hour or more and during this period of agitation the lithopone adsorbs most of the sodium silicate from the solution. The slurry is then filtered in the usual manner and the resultant cake of improved lithopone may be dried, disintegrated, and packed for shipment.

While we prefer to use from 0.3–0.5% of sodium silicate, these are not critical figures. The use of less than 0.3% for instance 0.2% will produce some improvement in flowing qualities. More than 0.5% may be used, but the use of more than 1% is not advisable.

The improvement produced in the flowing qualities of lithopone by the use of our invention is easily discernible when the pigment is incorporated in a paint. Paints containing the improved pigment, even in high concentration, dry to form uniform porcelain-like films free from brush marks, whereas this result cannot be attained when ordinary lithopone is used.

It is also possible to quantitatively measure the improved flowing qualities thus produced, by testing paints or enamels in the Gardner Flowmeter (see Circular #193 of the Paint Manufacturers Association). Typical tests are illustrated in the following tabulation:

| Paint | Flow at various periods | | | | | |
|---|---|---|---|---|---|---|
| | 15 sec. | 30 sec. | 1 min. | 2 min. | 3 min. | 5 min. |
| Normal lithopone in vehicle #1 | 3.50 | 3.75 | 3.90 | 4.00 | 4.05 | 4.15 |
| Improved lithopone in vehicle #1 | 3.70 | 3.95 | 4.35 | 4.80 | 5.05 | 5.25 |
| Normal lithopone in vehicle #2 | 4.00 | 4.25 | 4.45 | 4.65 | 4.75 | 4.85 |
| Improved lithopone in vehicle #2 | 4.25 | 4.55 | 4.85 | 5.20 | 5.35 | 5.65 |

In the tabulation all of the pigments used were of the "uniform fine-textured type" prepared in the manner hereinbefore described. The "normal" lithopone mentioned was the untreated material and the "improved" lithopone was the material containing silicate. Vehicle #1 was a bodied linseed oil containing 37% of volatiles. Vehicle #2 was a bodied soya bean oil containing 40% of volatiles ("varnolene"). All of the enamels tested contained 60% pigment and 40% vehicle. From the tabulation it will be noted that the flowing quality of the enamels containing the improved lithopone is substantially greater than that of the enamels containing normal lithopone at all stages of the tests. In practice, the enamels made with the improved lithopones dried to form uniform porcelain-like surfaces free from brush marks whereas the others did not.

Our invention thus described is capable of application not only to the uniform fine textured lithopone which we prefer to manufacture, but to ordinary lithopone as well. It is also applicable to the so-called special lithopones containing booster pigments such as titanium dioxide or extra zinc sulfide. Our invention is also applicable to the treatment of other pigments which are normally relatively deficient in flowing qualities, particularly when used in high concentration. Titanium dioxide pigment falls in this class of materials and we may improve the flowing qualities of titanium dioxide by following the procedure heretofore described in the case of lithopone. For example, we may prepare an aqueous slurry of $TiO_2$ containing about 1 part of pigment to 2½ parts of water. We then add from 0.3 to 0.5% of sodium silicate (based on the dry weight of the $TiO_2$) and agitate the mixture for half an hour or more after which the slurry may be filtered and the improved titanium dioxide dried and disintegrated in the usual manner.

Our invention is likewise applicable to the treatment of other pigments and extenders, such as calcium sulfate, barium sulfate, etc.

It is to be understood that other equivalent water soluble alkaline silicates may be used in place of sodium silicate.

We claim:—

1. In a process for producing lithopone the steps which comprise preparing an aqueous slurry of the previously precipitated, muffled, and quenched product, passing said slurry through a colloid mill to refine the grain size to that of a good French process zinc oxide, adding about 0.3-0.5% of sodium silicate, based on lithopone, agitating the slurry to permit the adsorption of the silicate, and filtering and drying the product.

2. In a process for producing lithopone, the steps which comprise preparing an aqueous slurry of the previously precipitated, muffled, and quenched product, adjusting the alkalinity of the pigment so that titration with methyl orange requires between 3 and 5 cc. of 1/50 normal sulfuric acid and the alkalinity with phenolphthalein is equal to .0002NaOH, passing said slurry through a colloid mill to refine the grain size to that of a good French process zinc oxide, adding about 0.3-0.5% of sodium silicate, based on lithopone, agitating the slurry to permit adsorption of the silicate, and filtering and drying the product.

3. In a process for producing a lithopone pigment, the steps which comprise preparing an aqueous slurry of calcined and quenched lithopone, refining this product to a grain size equal to that of a good French zinc oxide, adding about 0.2 to 0.5% of sodium silicate, based on the lithopone in the slurry, agitating the slurry to permit adsorption of the silicate, filtering and drying.

4. A pigment characterized in producing an excellent flow when incorporated in high concentration in a paint vehicle comprising uniform fine-textured, calcined lithopone containing a small amount of alkali metal silicate and having an alkalinity such that titration with methylorange requires more than about 3 cc. N/50 sulfuric acid but not more than 5 cc. plus such amount which corresponds to the alkalinity of the silicate present.

FRANK G. BREYER.
JOSEPH P. KOLLER.